US010818060B2

(12) United States Patent
Greenberg et al.

(10) Patent No.: US 10,818,060 B2
(45) Date of Patent: Oct. 27, 2020

(54) SYSTEMS AND METHODS FOR GUIDING MOTION CAPTURE ACTORS USING A MOTION REFERENCE SYSTEM

(71) Applicant: Activision Publishing, Inc., Santa Monica, CA (US)

(72) Inventors: Jason E. Greenberg, Los Angeles, CA (US); Kristina Rae Adelmeyer, Burbank, CA (US); Jeff J. Swenty, North Hills, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 15/695,941

(22) Filed: Sep. 5, 2017

(65) Prior Publication Data
US 2019/0073815 A1    Mar. 7, 2019

(51) Int. Cl.
| G05D 25/02 | (2006.01) |
| G06T 7/20 | (2017.01) |
| G06T 13/40 | (2011.01) |
| H04N 5/775 | (2006.01) |
| G02F 1/01 | (2006.01) |

(52) U.S. Cl.
CPC ............ *G06T 13/40* (2013.01); *G02F 1/0121* (2013.01); *G05D 25/02* (2013.01); *H04N 5/775* (2013.01)

(58) Field of Classification Search
CPC ........ G05D 25/00; G05D 25/02; A63F 9/0613
USPC ...................................................... 359/257
See application file for complete search history.

(56) References Cited

U.S. PATENT DOCUMENTS

| 5,530,796 A | 6/1996 | Wang |
| 5,561,736 A | 10/1996 | Moore |
| 5,563,946 A | 10/1996 | Cooper |
| 5,685,775 A | 11/1997 | Bakoglu |
| 5,706,507 A | 1/1998 | Schloss |

(Continued)

FOREIGN PATENT DOCUMENTS

| AU | 2005215048 | 10/2011 |
| CA | 2143874 | 6/2000 |

(Continued)

OTHER PUBLICATIONS

Huang, Liang, "A Method of Speed Control during Over-ground Walking: Using a Digital Light-Emitting Diode Light Strip", Trans Tech Publications, 2013 (Year: 2013).*

(Continued)

*Primary Examiner* — Diane M Wills
(74) *Attorney, Agent, or Firm* — Novel IP

(57) ABSTRACT

The system provides movement guidance to an actor using a motion capture movement reference system. The motion capture movement reference system includes a light strip having an elongated substrate with lights positioned in series along a length of the elongated substrate and a computing device configured to program the lights with an illumination protocol. Operationally, a user inputs into the computing device one or more variables to establish a number of lights to simultaneously activate and/or a rate of activating and deactivating the lights along the length of the elongated substrate. The light strip is programmed based upon the one or more variables. When the lights are activated and deactivated along the length of the elongated substrate, an actor chases the lights.

19 Claims, 13 Drawing Sheets

(56) References Cited

U.S. PATENT DOCUMENTS

| | | |
|---|---|---|
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,525,731 B1 | 2/2003 | Suits |
| 6,549,933 B1 | 4/2003 | Barrett |
| 6,567,109 B1 | 5/2003 | Todd |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,886,026 B1 | 4/2005 | Hanson |
| 6,948,168 B1 | 9/2005 | Kuprionas |
| RE38,865 E | 11/2005 | Dumarot |
| 6,993,596 B2 | 1/2006 | Hinton |
| 7,028,296 B2 | 4/2006 | Irfan |
| 7,062,533 B2 | 6/2006 | Brown |
| 7,143,409 B2 | 11/2006 | Herrero |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |

(56) References Cited

U.S. PATENT DOCUMENTS

| | | |
|---|---|---|
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,992,316 B2 | 3/2015 | Smith |
| 9,067,116 B1* | 6/2015 | Heikenen ........... A63B 71/0686 |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,525,746 B2 | 12/2016 | Bates |
| 9,583,109 B2 | 2/2017 | Kurata |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2007/0217209 A1* | 9/2007 | Wong ................ H05B 33/0842 |
| | | 362/418 |
| 2009/0113448 A1 | 4/2009 | Smith |
| 2009/0324017 A1* | 12/2009 | Gordon ............. G06K 9/00255 |
| | | 382/103 |
| 2014/0344725 A1 | 11/2014 | Bates |
| 2016/0191671 A1 | 6/2016 | Dawson |
| 2016/0252326 A1* | 9/2016 | Jones .................... G09B 9/003 |
| | | 434/19 |

FOREIGN PATENT DOCUMENTS

| | | |
|---|---|---|
| CA | 2292678 | 7/2005 |
| CA | 2552135 | 7/2013 |
| CN | 1334650 A | 2/2002 |
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |

(56) References Cited

FOREIGN PATENT DOCUMENTS

| | | |
|---|---|---|
| GB | 2352154 | 7/2003 |
| JP | 3033956 B2 | 4/2000 |
| JP | 3124916 B2 | 1/2001 |
| JP | 3177221 B2 | 6/2001 |
| JP | 3199231 B2 | 8/2001 |
| JP | 3210558 B2 | 9/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| MY | 117864 A | 8/2004 |
| SG | 55396 | 12/1998 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 2002073457 | 9/2002 |
| WO | 20020087156 | 10/2002 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Wagner, Kurt, "Here's what it's like to be scanned into an NBA video game", recode.com, Sep. 16, 2016 (Year: 2016).*

* cited by examiner

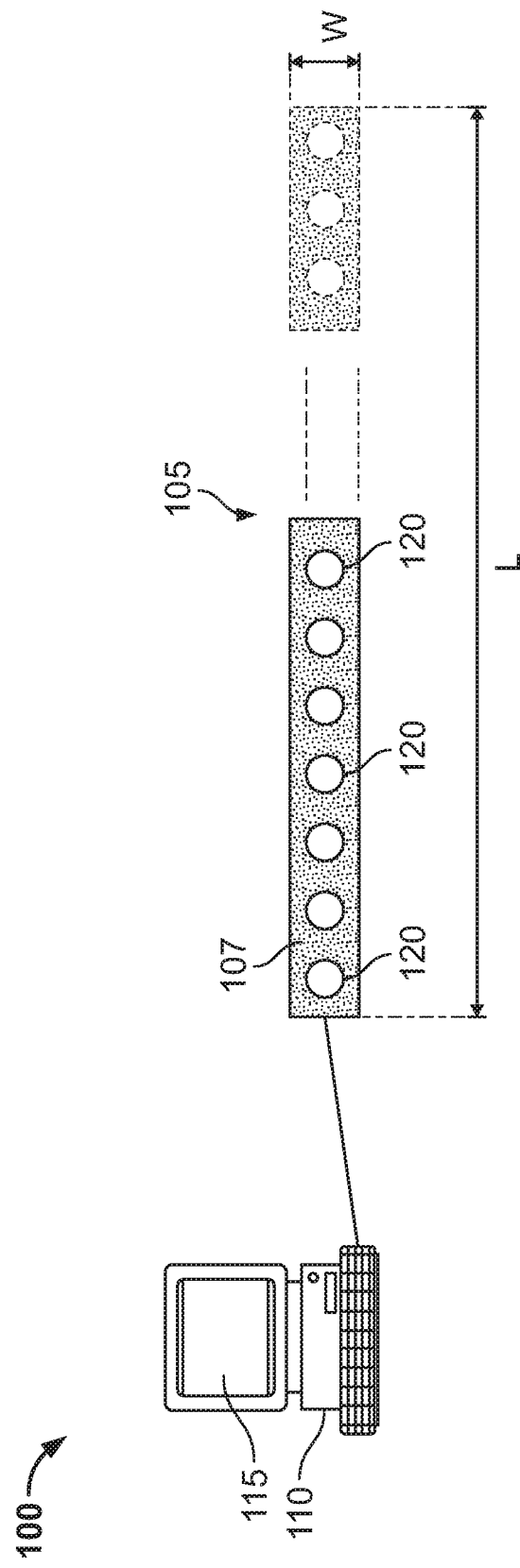

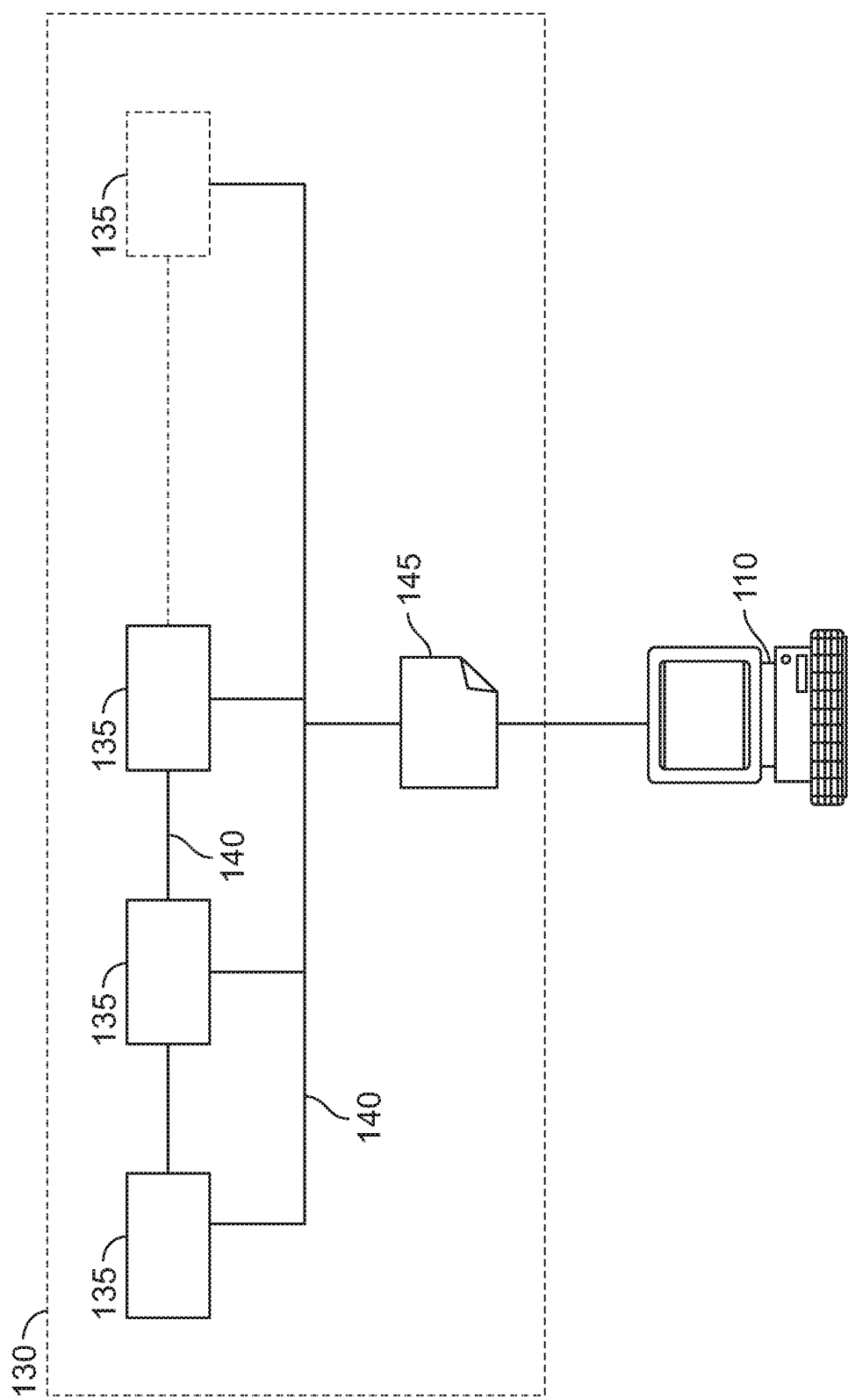

SYSTEMS AND METHODS FOR GUIDING MOTION CAPTURE ACTORS USING A MOTION REFERENCE SYSTEM

FIELD

The present application relates to a motion capture system. More particularly, the present application relates to an LED-based motion reference system that generates pulses of light moving at predetermined speeds to provide a reference guide for a human actor.

BACKGROUND

Motion capture (mocap) is the process of recording the movement of real objects, such as a human actor, in order to create source data that is used to conform the movement onto a computer graphics animation character or digital avatar of the object. A typical motion capture system uses one or more digital cameras to record the movement of the actor while illuminating a number of markers attached at a number of locations on a suit that the actor wears. A digital representation or rendering of the actor in motion is thereafter generated by analyzing the coordinates of the markers in the captured images and mapping them onto a corresponding computer graphics animation character.

Mocap offers advantages over traditional computer animation of a 3D model such as: enabling a preview of the spatial representation of the actor's movements in real-time or near real-time, and allowing computer graphics animation characters to display more realistic and natural movement characteristics.

Notwithstanding the advantages of motion capture systems, it is often desired that a CG animation character move, in a video game for example, at different speeds as desired by a player. Accordingly, the actor must portray movement at different speeds that are then mapped on to the animation character. However, for the director and production team, it is very difficult to verbally explain how fast or slow the actor should move or at what pace. For human actors, while it may be fairly straightforward to move in a particular direction, it is often difficult to understand what the precise speed, pace, or rate of such movement should be. Conventionally, a metronome may be used to provide actors with a pacing mechanism, but for actors moving in a direction, it is difficult to equate the rate of movement with the pacing of a metronome.

Therefore, there is a need to provide a reference system that enables an actor to move (e.g., crawl, skip, walk and/or run) at predefined, and potentially varying, speeds in order to generate source motion capture data with the desired character pacing. It is also desirable for the reference system to be intuitive and easy for the actor to follow. It is further desirable for the reference system to be mobile, simple to deploy and easy to move or adjust.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a method for providing movement guidance to an actor using a motion capture movement reference system, wherein the motion capture movement reference system comprises a light strip having an elongated substrate with a plurality of lights positioned in series along a length of the elongated substrate and a computing device configured to program said plurality of lights with an illumination protocol, the method comprising: inputting into said computing device at least one variable to establish at least one of a number of lights of the plurality of lights to simultaneously activate and a rate of activating and deactivating said plurality of lights along the length of the elongated substrate; using said computing device, programming the light strip based upon said at least one variable; instructing an actor to chase said plurality of lights as they activate along the length of the elongated substrate; and initiating said activating and deactivating of said plurality of lights along the length of the elongated substrate.

Optionally, said motion capture movement reference system comprises a plurality of control modules and a micro-controller, wherein each of said control modules is connected to at least one of said plurality of lights, and wherein said micro-controller is in communication with said plurality of control modules.

Optionally, said computing device includes a memory, a display, a keyboard and a processor, said computing device being in communication with said micro-controller, wherein said memory stores a plurality of instructions that instructs the processor to communicate control signals to said micro-controller, wherein said control signals enable said plurality of control modules to control said plurality of lights according to an illumination protocol.

Optionally, each of said control modules is connected to three lights and said lights are LED elements.

Optionally, said illumination protocol comprises motion of a pulse from a proximal end to a distal end of said substrate, and wherein said pulse includes three lights switched on and off simultaneously. Optionally, said control signals determine at least a speed at which said pulse moves.

Optionally, the method further comprises using at least one video camera to capture a motion of said actor while the actor chases said plurality of lights.

Optionally, said control signals determine at least a speed at which a pulse travels along said elongated substrate, and said speed is customizable by a user to a second value.

Optionally, said control signals also determine a length of said pulse, and said length includes LED elements in multiples of three.

The present specification also discloses a method of guiding an actor to move at a desired speed, said desired speed being one of a plurality of customizable speeds, the method comprising: positioning an elongated substrate on a floor, said substrate comprising a plurality of LED elements, at least one control module and a micro-controller, wherein said at least one control module is connected to at least one of said plurality of LED elements, and wherein said micro-controller is in communication with said at least one control module; using a computing device to communicate control signals to said micro-controller, wherein said control signals program said at least one control module to control said plurality of LED elements according to an illumination protocol; and having said actor synchronously move with said illumination protocol to achieve said desired speed.

Optionally, said method comprises a plurality of control modules, wherein each of said plurality of control modules is connected to at least three of said plurality of LED elements.

Optionally, said illumination protocol comprises a motion of a pulse from a proximal end to a distal end of said elongated substrate, and said pulse includes a series of at least two LED elements switched on simultaneously and then switched off simultaneously.

Optionally, said control signals determine at least a speed at which said pulse moves.

Optionally, said actor chases said moving pulse to move at said desired speed of said pulse.

Optionally, said control signals determine at least a speed at which a pulse travels along said elongated substrate, and said desired speed is customizable by a user to a second value.

Optionally, said control signals also determine a length of said pulse, and said length includes LED elements in multiples of three.

The present specification also discloses a system for generating a moving pulse of light to act as a reference for an actor's motion, the system comprising: a flexible substrate strip having a plurality of LED elements, a plurality of control modules and a micro-controller, wherein each of said plurality of control modules is associated with and controls at least two of said plurality of LED elements, and wherein said micro-controller is in communication with said plurality of control modules; and a computer system to communicate signals to said micro-controller to generate said moving pulse, wherein said signals determine at least one of a number of control modules simultaneously switching on and off their associated LED elements and a speed of said switching on and off.

Optionally, said speed is one of a plurality of desired movement speeds of a digital avatar.

Optionally, said computer system displays a GUI for enabling a user to customize at least one of said number of control modules simultaneously switching on and off associated LED elements and said speed of switching on and off to a second value.

Optionally, each of said plurality of control modules is associated with and controls three LED elements.

The aforementioned and other embodiments of the present specification shall be described in greater depth in the drawings and detailed description provided below.

BRIEF DESCRIPTION OF THE DRAWINGS

These and other features and advantages of the present specification will be further appreciated, as they become better understood by reference to the following detailed description when considered in connection with the accompanying drawings:

FIG. 1A shows a motion capture movement reference system, in accordance with an embodiment of the present specification;

FIG. 1B is a circuit diagram of a lighting system, in accordance with an embodiment of the present specification;

DETAILED DESCRIPTION

Figure 1C:
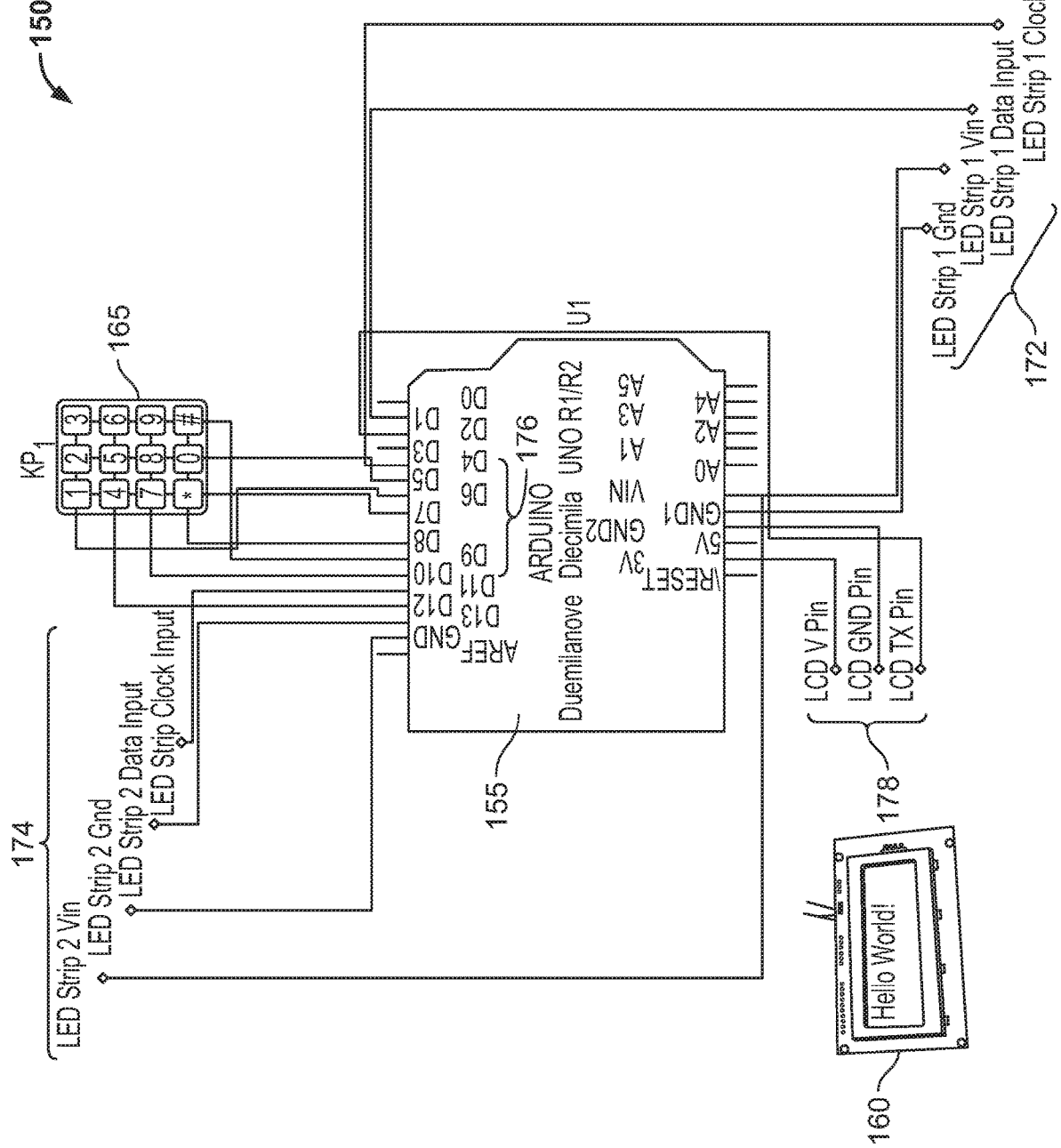
FIG. 1C illustrates a control system for programming at least one LED strip, in accordance with an embodiment of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

As used herein, the indefinite articles "a" and "an" mean "at least one" or "one or more" unless the context clearly dictates otherwise.

As used herein, the term actor refers to a being, such as a human, who is the subject of a motion capture system, wears clothing having markers attached at various locations to enable digital cameras to record the being's movement, and/or is expected to move as guided by the motion capture movement reference system of the present specification.

FIG. 1A shows a motion capture movement reference system 100 comprising an elongated arrangement of lights 105 in data communication with a computer system 110 and display 115, in accordance with an embodiment. The elongated arrangement of lights 105 comprises a plurality of individual lights, preferably a plurality of individual light emitting diodes (LEDs), 120 embedded into, or mounted upon, a flexible substrate 107. In one embodiment, the flexible substrate 107 is configured in the form of a strip form having a longitudinal length L and a width W, wherein the length L is at least 3 feet and wherein the width is at least 1 inch. In one embodiment, the length is at least 3 feet, and can be as long as necessary (e.g. 10 feet or greater), to provide actors with a sufficient runway to initiate, engage in, and complete a movement. In one embodiment, the width is at least 1 inch, and can be as wide as necessary to provide actors with a sufficiently large enough light source to easily see and follow.

The computer system 110 comprises a plurality of programmatic instructions that, when executed, provide a front-end GUI (Graphical User Interface) through which the plurality of lights may be programmed, as further described below. In various embodiments, the computer system 110 includes conventional computer components such as a processor, necessary non-transient memory or storage devices such as a RAM (Random Access Memory) and disk drives, monitor or display 115 and one or more user input devices such as a keyboard and a mouse. In embodiments, the user input devices allow a user to select objects, icons, and text that appear on the monitor 115 via a command such as a click of a button on a mouse or keyboard. The computer system 110 is also in communication with one or more motion capture devices, such as video cameras, that capture the motion of the actor. The computer system 110 may also include software that enables wireless or wired communications over a network such as the HTTP, TCP/IP, and RTP/RTSP protocols. It should further be appreciated that the GUI may be implemented on a standalone computer or laptop or via one or more local or remotely located servers in a "cloud" configuration.

The plurality of LED elements 120 are connected to a plurality of LED drive circuits or LED control modules (FIG. 1B). It should be appreciated that, while the presently disclosed embodiments are described with the individual lights being LEDs, any type of individual light may be used, including incandescent bulbs (for example, Tungsten-Halogen incandescent bulbs), fluorescent light bulbs (for example, Compact Fluorescent Lamps (CFLs)), halogen bulbs, High-Intensity Discharge (HID) bulbs such as metal halide lights, high pressure sodium lights, low pressure sodium lights and mercury vapor lights.

FIG. 1B is a circuit diagram 130 of the LED lighting system 105, in accordance with an embodiment. Referring now to FIGS. 1A and 1B, the circuit 130 includes a plurality of LED control modules 135 each associated with and controlling at least one of the LED elements 120. In one embodiment, each control module 135 controls a segment of at least two adjacent LED elements 120. In one embodiment, each control module 135 controls a segment of three adjacent LED elements 120. However, in alternate embodiments each control module 135 may control less than or more than three LED elements depending upon a specific need of an application.

The plurality of LED control modules 135 pulse associated LED elements 120 on and off. In some embodiments, each control module 135 provides a pulse width modulated signal (PWM) to pulse the associated one or more LED elements 120 on and off. All control modules 135 are connected to each other via an SPI (Serial Peripheral Interface) bus 140 and a micro-controller 145 is provided which is also connected to the bus 140.

In embodiments, the micro-controller 145 receives, from the computer system 110, control parameters or variables corresponding to an illumination protocol and generates signals, in accordance with this illumination protocol, to each control module 135 which accordingly provide PWM signals to the associated one or more LED elements 120. In embodiments, the micro-controller 145 is in wired or wireless data communication with the computer system 110.

As discussed above, the computer system 110 implements programmatic instructions to store and execute user inputs received via the GUI for one or more control parameters or variables associated with programming an illumination protocol of the LED lighting system 105.

In various embodiments, the control parameters or variables comprise at least one of a) a length of a single pulse, also referred to as a 'tail'—that is, the number of LED elements 120 that are switched on and off simultaneously b) the speed at which the single pulse appears to traverse, cycle or move along the substrate 107 from a proximal end to a distal end of the lighting strip 105 and c) a rate indicate of a response time of an LED element 120, that is a duration of time during which an LED element 120 is flashed on. In some embodiments, the control parameter defining the speed of the single pulse may have additional sub-parameters or variables defining whether the speed remains constant or varies, such as increase or decrease, as the single pulse appears to traverse through the strip 105.

In some embodiments, an additional control parameter or variable may define specific colors, such as red, green, blue and/or yellow, of one or more LEDs. In an embodiment, a user may customize the color of one or more LEDs by inputting RGB values. In still other embodiments, the control parameters or variables may additionally include a plurality of pre-stored personalized illumination protocols. In one embodiment, a personalized illumination protocol may involve a specific combination of colored LED light illumination scheme. In an exemplary personalized protocol, a first travelling single pulse may be of green color indicating to a user that he should start chasing the travelling pulse. The first pulse of green color may traverse a first portion of the strip 105. At an end of the first portion, the travelling pulse may be of yellow color indicating to the user to slow down. The second pulse of yellow color may traverse a second portion of the strip 105. At the end of the second portion, the travelling pulse may come to a stop in the form of one or more red colored LED indicating to the user to stop moving.

Figure 5:
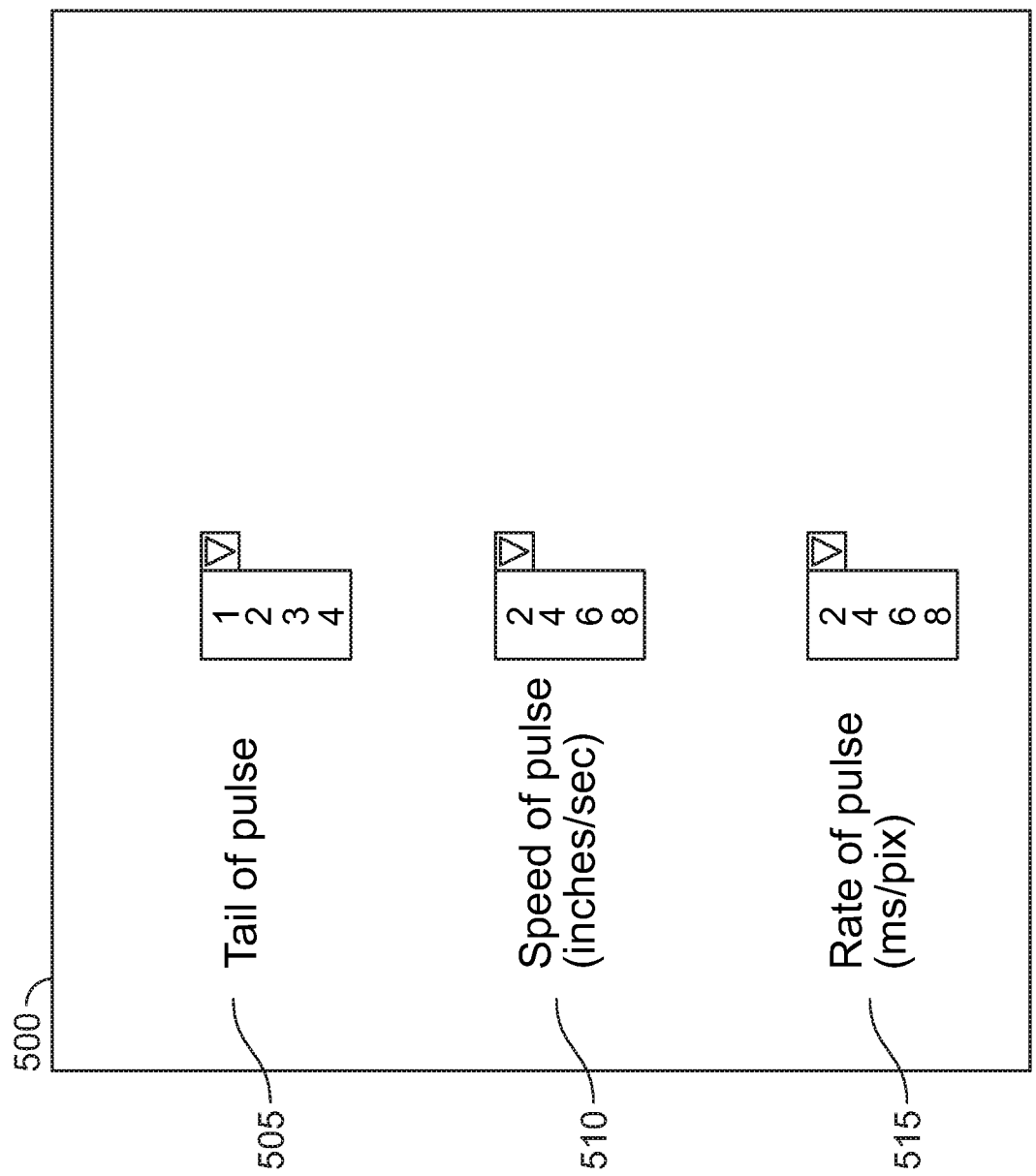
FIG. 5 is a graphic user interface (GUI) for inputting at least two parameters defining an illumination protocol, in accordance with an embodiment of the present specification.

Through the GUI, a user may vary or customize at least the length ('tail'), speed and/or the rate of a single pulse and/or color of the LED elements. In some embodiments, the customization is enabled by displaying (to the user) on the display 115 a GUI with at least three parameters: 1) the length or tail of a single pulse; 2) the speed of a single pulse; and 3) the rate of a single pulse. The GUI may also show default values of the three parameters and optionally respective ranges of values within which the user may vary or customize the three parameters. The user can input, using any input means such as, but not limited to, a keyboard, the values for the three parameters and therefore customize the illumination protocol of the LED lighting system 105. FIG. 5 shows a GUI 500 to accept user inputs for at least one of three parameters, in accordance with an embodiment of the present specification. As shown, the GUI 500 displays at least a first parameter 505 defining a length ('tail') of a single pulse, a second parameter 510 defining a speed of the single pulse and a third parameter 515 defining a rate or response time of the single pulse. The GUI 500 displays current default values of the three parameters that can be modified by choosing, for example, from corresponding drop down list of values. It should be appreciated that in alternate embodiments, the GUI 500 may include fewer than the aforementioned three parameters or may also include additional parameters such as those of choosing between constant and variable (increasing or decreasing) speed of pulse, color of pulse and/or personalized pules protocol as discussed earlier in the specification.

Figure 2B:
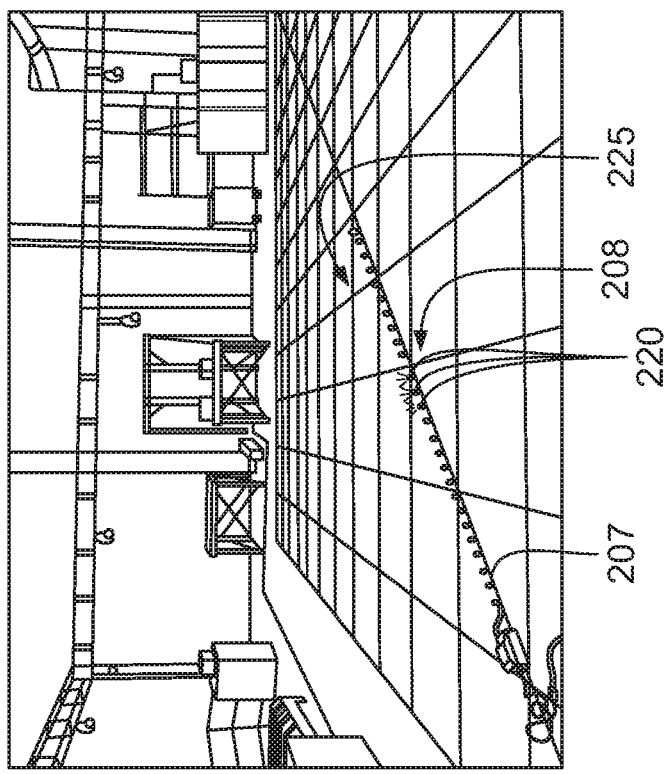
FIG. 2B shows a second position of the single pulse of LED light traversing the LED strip, in accordance with an embodiment of the present specification.
Figure 2A:
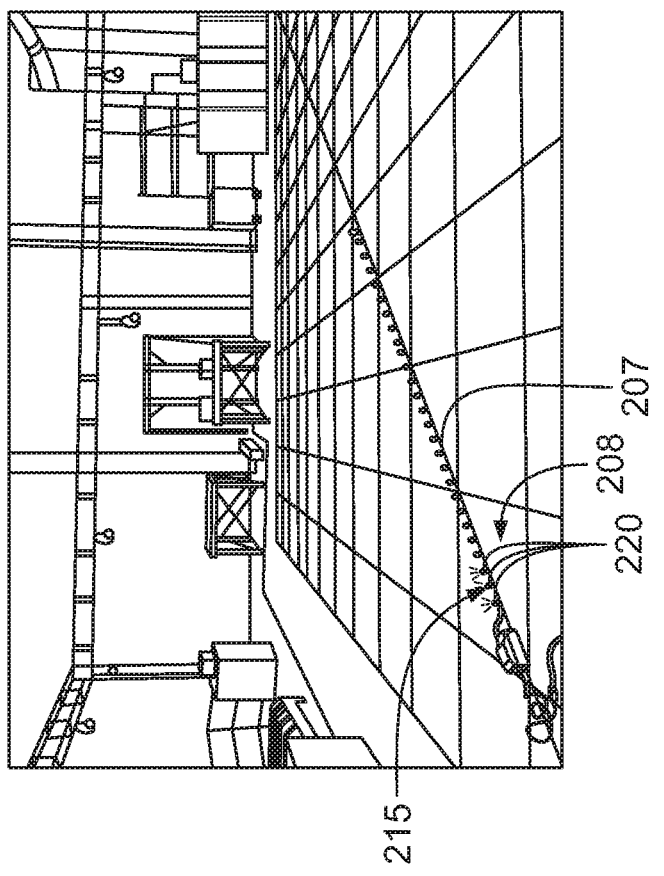
FIG. 2A shows a first position of a single pulse of LED light traversing an LED strip, in accordance with an embodiment of the present specification.

It should be appreciated that the length ('tail') of a single pulse may also be a function of the number of LED elements 120 controlled by a single control module 135. Thus, in embodiments where a single control module 135 controls three LED elements 120, the length of a single pulse and therefore the number of LED elements that can be simultaneously switch on and off, may be programmed or customized to vary in multiples of three. For example, if the user provides a value of 1 for a length of a single pulse, this would mean that the single pulse would include three LED elements. In another example, if the user provides a value of 2 for a length of a single pulse, this would mean that the single pulse would include six LED elements. FIGS. 2A and 2B show an LED strip 207 having a single pulse 208 comprising three LED elements 220, in accordance with an embodiment. It should be appreciated that a single control module 135 may control any number of LED elements from 1 to 100.

Therefore, in some embodiments where a single control module 135 controls a single LED element 120 the length of a single pulse and therefore the number of LED elements that can be simultaneously switch on and off may be programmed or customized to vary in multiples of one. In an example, if a user provides a value of 1 for a length of a single pulse, it would mean that the single pulse would include a single LED element. In another example, if the user provides a value of 4 for a length of a single pulse, it would mean that the single pulse would include four LED elements.

Also, the speed at which the single pulse traverses, cycles or moves along the substrate or strip 107 is a function of a rate at which consecutive control modules 135 switch on and off (or activate and deactivate) associated LED elements 120. In various embodiments, the speed is quantified in units that are compatible with, match or correspond to the content or application for which the motion capture video is being generated. For example, in some embodiments, the speed value is defined and customized in inches/second which matches with the units used to define movement or motion speed of a character in a video game. Of course, in alternate embodiments, the speed value can be defined and customized in other units, such as, but not limited to, centimeters/second or feet/second, as would be advantageously evident to persons of ordinary skill in the art. In embodiments, the rate or response time of the LED elements 120 is defined and customized in milliseconds per pixel (ms/pix). Referring back to FIGS. 2A and 2B, the single pulse 208 can be seen as having moved or traversed from a first position 215 (FIG. 2A) to a second position 225 (FIG. 2B) at a defined, and customizable, speed.

While in the embodiment of FIGS. 1A, 1B the computer system 110 is used to control and program the plurality of lights 120, in a preferred embodiment the plurality of lights 120 are controllable and programmable through a control system 150 shown in FIG. 1C. Referring now to FIG. 1C, the control system 150 comprises a stand-alone physical programmable circuit board or microcontroller 155, a serial enabled LCD display 160 and a 12-button keypad 165 in data communication (wired or wireless) with each other. In embodiments, the microcontroller 155 is an Arduino microcontroller board, the LCD display 160 is a SparkFun Electronics® serial enabled LCD (such as part LCD-09568) while the keypad 165 is also a SparkFun Electronics® 12-button keypad (such as part COM-08653).

As shown in FIG. 1C, the microcontroller 155 includes a plurality of first Input/Output (I/O) pins 172 for interfacing with a first LED strip, a plurality of second (I/O) pins 174 for interfacing with a second LED strip, a plurality of third pins 176 for interfacing with the keypad 165 and a plurality of fourth (I/O) pins 178 for interfacing with the LCD display 160. In an embodiment, each of the plurality of pins 172 and 174, for interfacing with both the first and second LED strips, include pins for grounding, clock input, data input and power. In an embodiment, the plurality of third pins 176 interface with 7 output pins of the keypad 165. This allows the microcontroller 155 to scan the 7 output pins to see which of the 12 buttons is being pressed. In an embodiment, the plurality of fourth pins 178 includes pins for grounding, transmitting and power.

In embodiments, the microprocessor 155 is programmed to control one or more LED strips, such as the plurality of lights 120 of FIG. 1A, through user inputs via the keypad 165 such that the user inputs are displayed on the LCD display 160. The user inputs enable customization of one or more control parameters or variables associated with programming an illumination protocol of the LED lighting system 105 (FIG. 1A).

FIGS. 1D through 1J illustrate, in accordance with some embodiments, use of the control system 150 for modifying or customizing one or more control parameters or variables associated with programming an illumination protocol of the LED lighting system, such as an LED strip 180. In various embodiments, shown in FIGS. 1D through 1J, the control system 150 is configured in the form of a housing 182 encompassing the microcontroller 155 (FIG. 1C) in data communication with the LCD display 160 and the 12 button keypad 165.

Figure 1E:
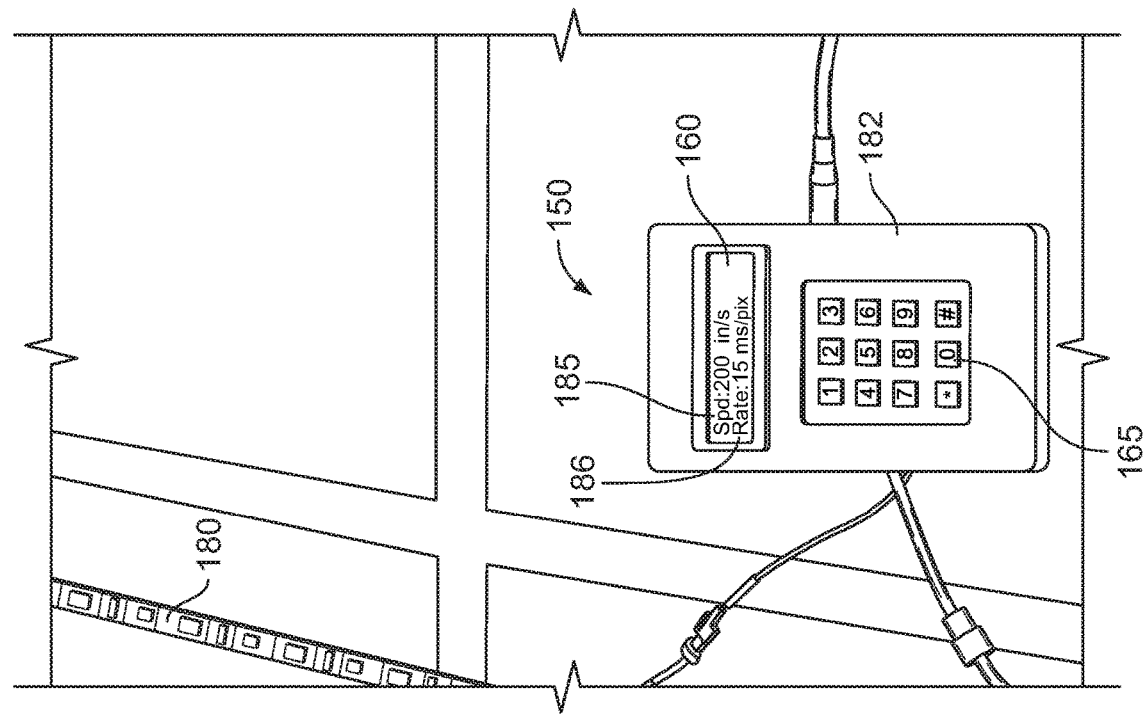
FIG. 1E illustrates the control system of FIG. 1C employed for inputting second values for the first and second control parameters of the LED strip, in accordance with an embodiment of the present specification.
Figure 1D:
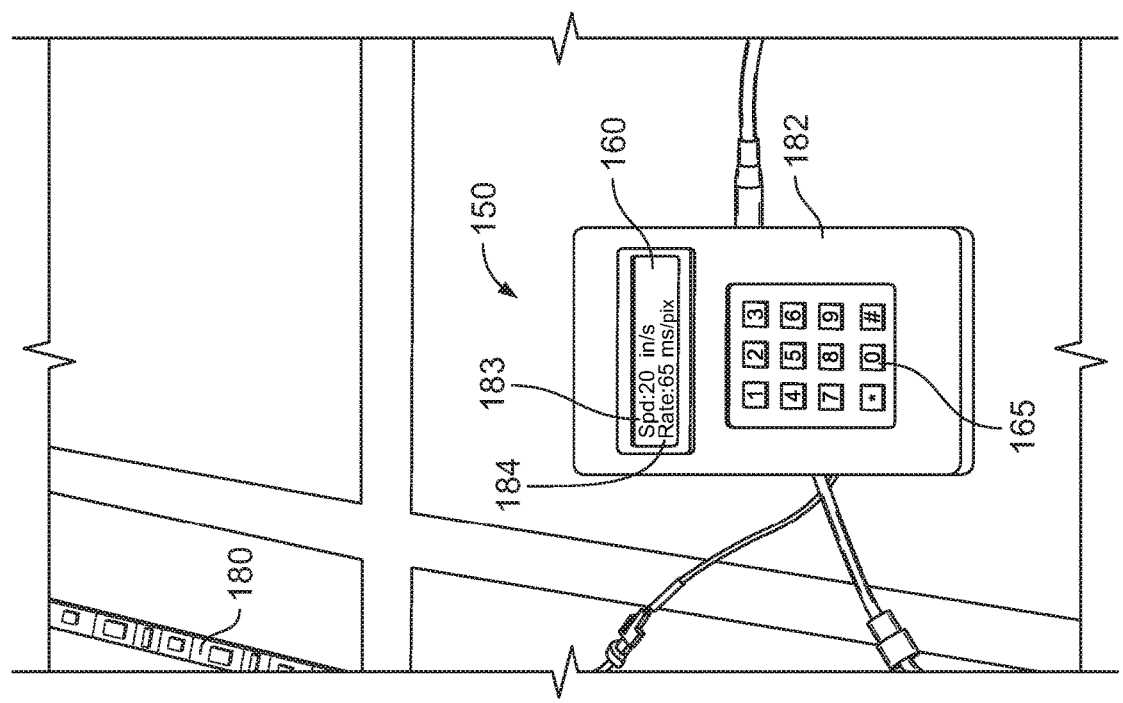
FIG. 1D illustrates the control system of FIG. 1C employed for inputting first values for first and second control parameters of an LED strip, in accordance with an embodiment of the present specification.

FIG. 1D shows a user using the keypad 165 to input first values 183, 184 for the respective control parameters, namely, speed and rate, which are also displayed on the LCD 160. In some embodiments, the parameter speed determines a pace at which a single pulse appears to traverse, cycle or move while the parameter rate determines a response time of an LED element constituting the single pulse (in other words, the parameter rate is indicative of an amount of time that an LED element is flashed on). FIG. 1E shows the user using the keypad 165 to input second values 185, 186 for the respective control parameters speed and rate.

Figure 1G:
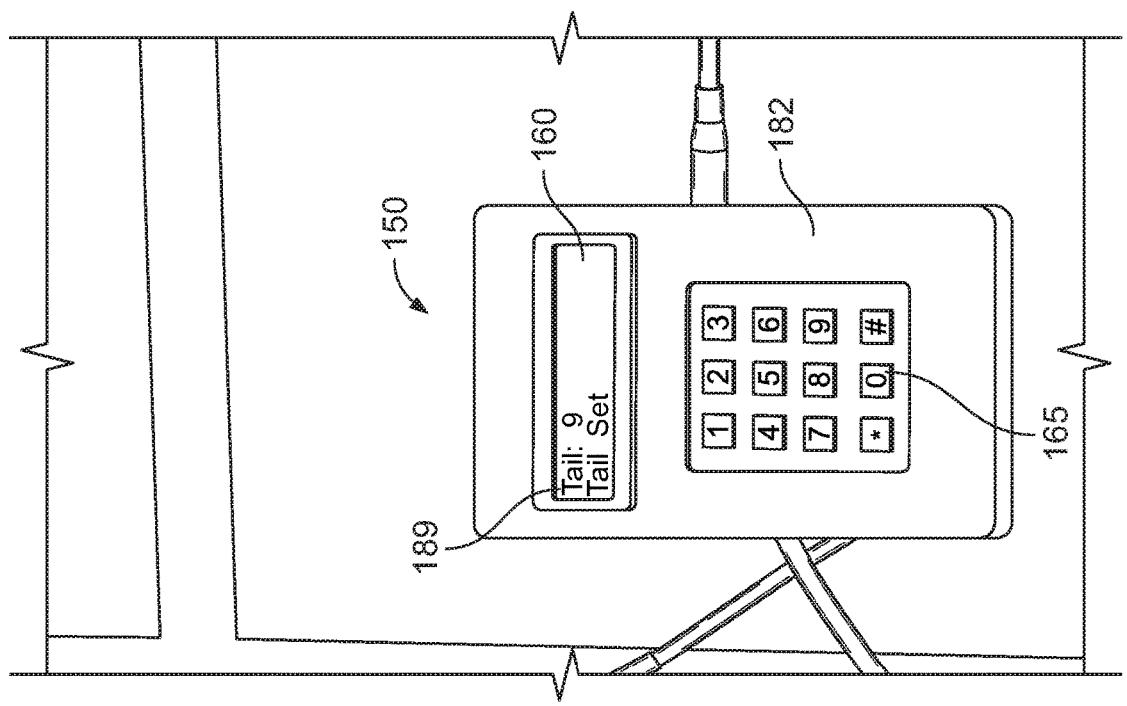
FIG. 1G illustrates the control system of FIG. 1C employed for inputting a first value for a third control parameter of the LED strip, in accordance with an embodiment of the present specification.
Figure 1F:
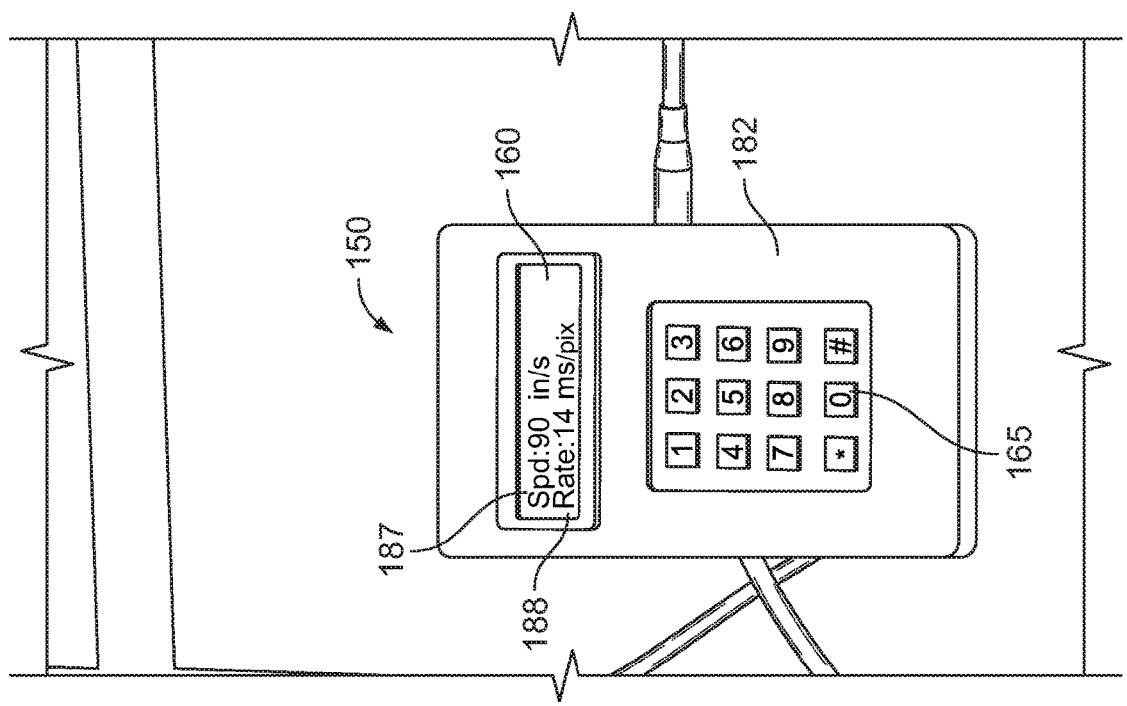
FIG. 1F illustrates the control system of FIG. 1C employed for inputting third values for the first and second control parameters of the LED strip, in accordance with an embodiment of the present specification.
Figure 1H:
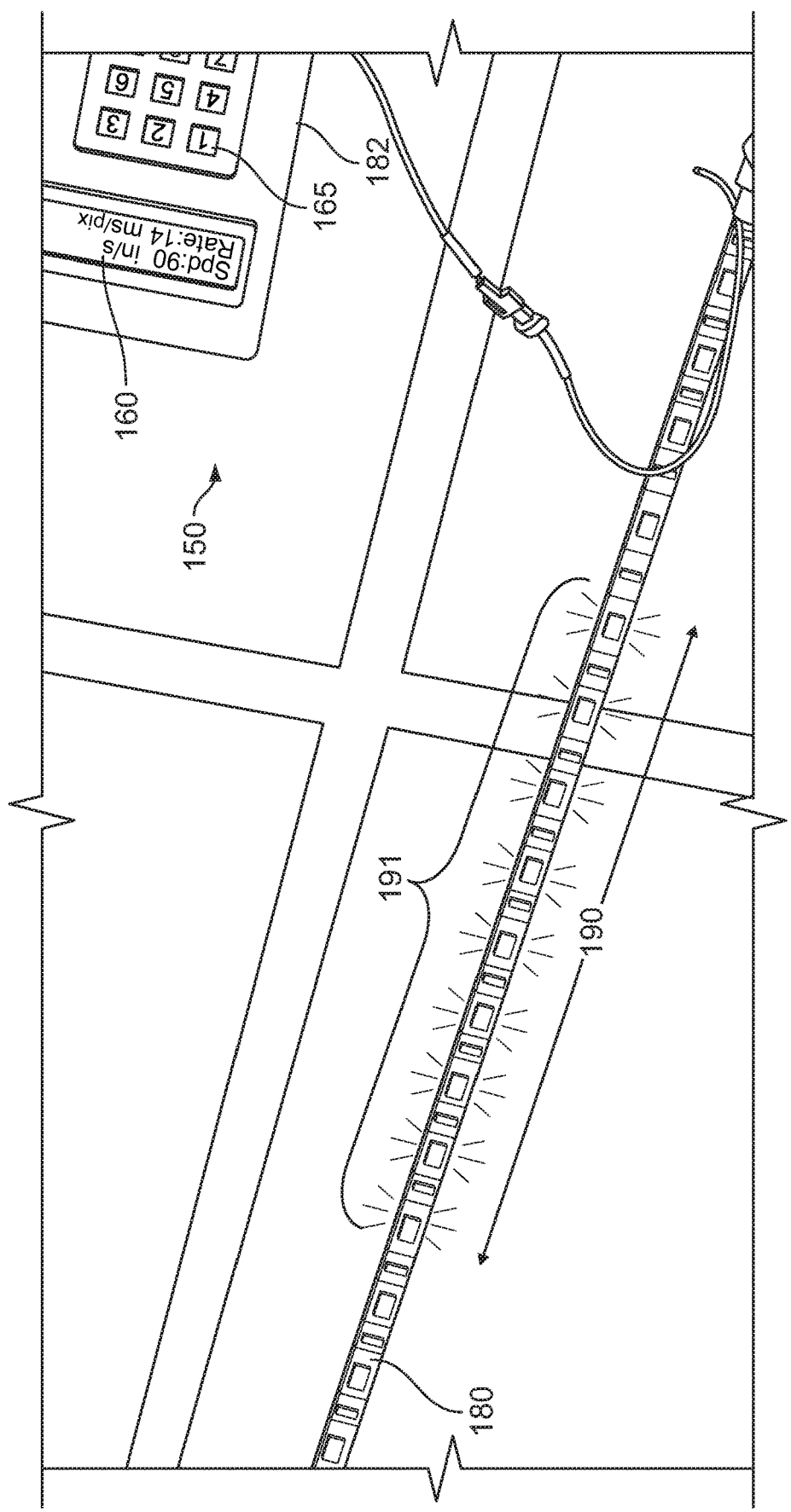
FIG. 1H illustrates a first length of a single pulse of LEDs of the LED strip, in accordance with an embodiment of the present specification.
Figure 1I:
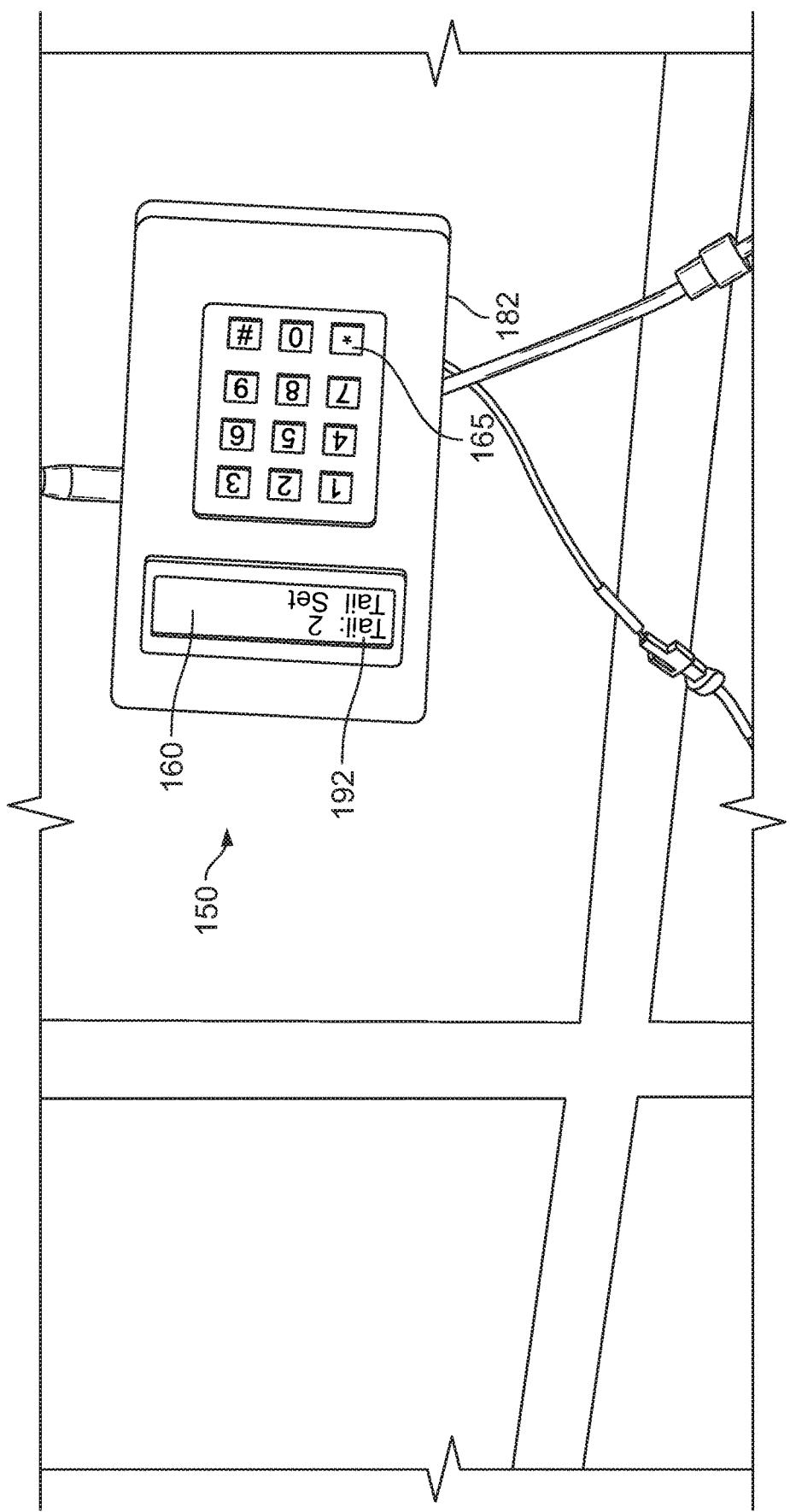
FIG. 1I illustrates the control system of FIG. 1C employed for inputting a second value for the third control parameter of the LED strip, in accordance with an embodiment of the present specification.
Figure 1J:
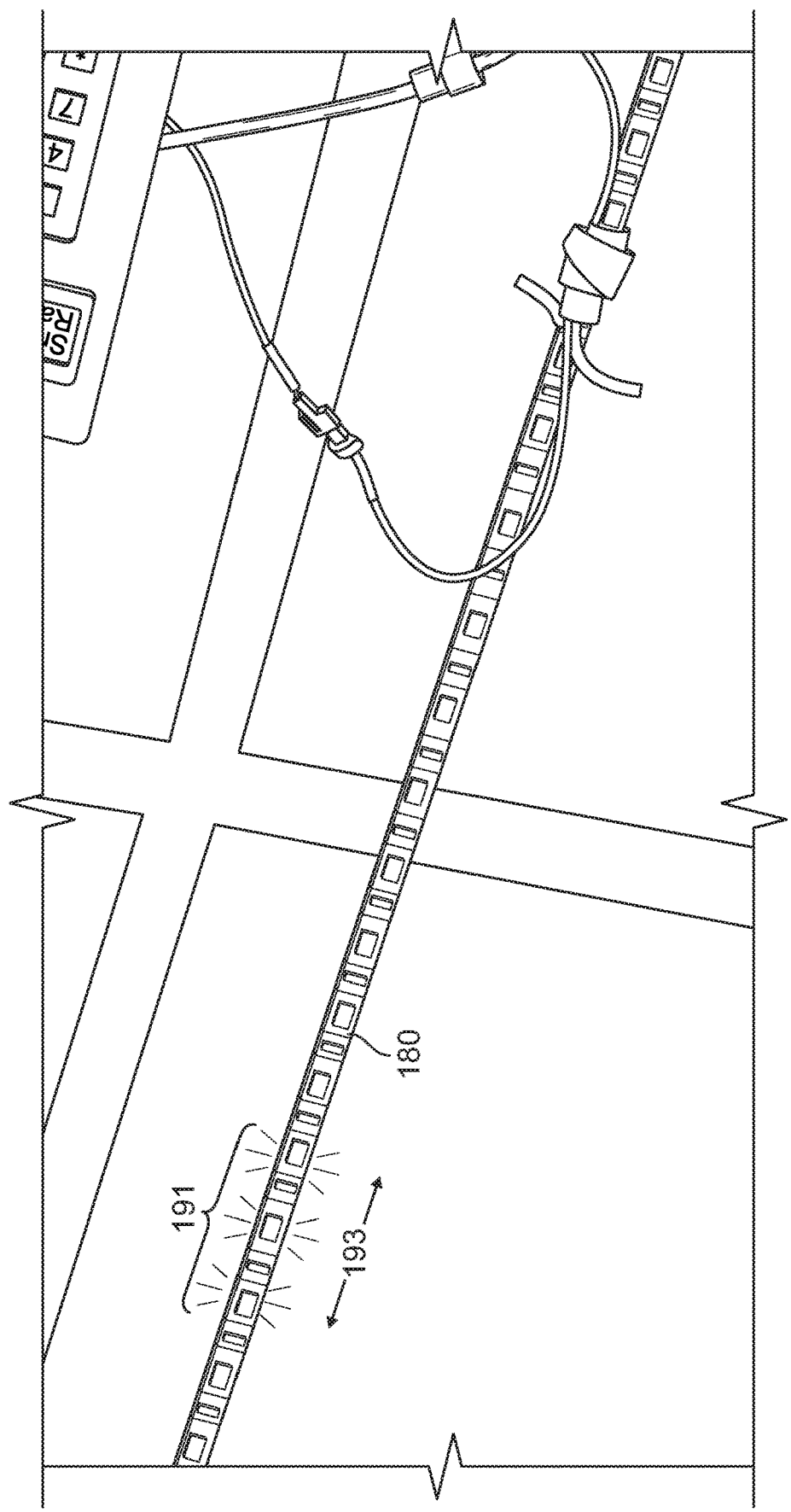
FIG. 1J illustrates a second length of a single pulse of LEDs of the LED strip, in accordance with an embodiment of the present specification.

FIG. 1F illustrates the control parameters speed and rate being set at respective third values 187, 188 in addition to a control parameter tail, which is set at a first value 189 in FIG. 1G. In embodiments, as shown in FIG. 1H, the tail or length parameter determines a first length 190 of a single pulse 191 of LEDs, wherein 'tail' is defined as the number of LEDs constituting a single pulse. FIG. 1I illustrates the tail parameter being modified to a second value 192 while the speed and rate parameters are maintained at the third values 187, 188 as defined with respect to FIG. 1F. As a result, as shown in FIG. 1J, a modification of the tail parameter to the second value 192 (FIG. 1I) results in the single pulse 191 having a second length 193 of LEDs. In embodiments, the second length 193 is less than the first length 190.

In addition, a user may use keypad 165 to input RGB values to customize the color of one or more LEDs.

Figure 4:
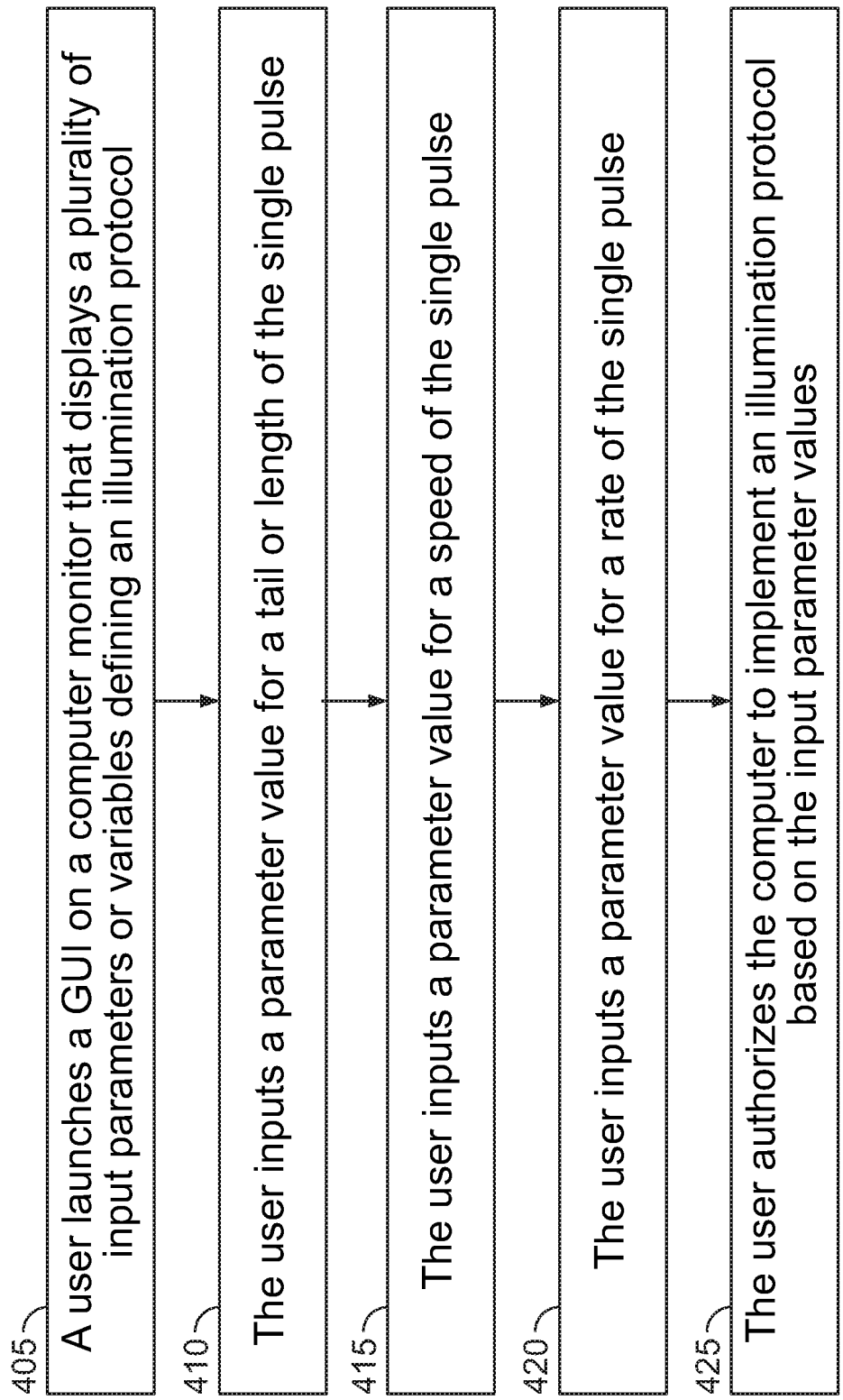
FIG. 4 is a flow chart illustrating a method of implementing an illumination protocol, in accordance with an embodiment of the present specification.

FIG. 4 is a flow chart of a plurality of steps of a method of implementing an illumination protocol, in accordance with an embodiment of the present specification. Referring to FIG. 4, at step 405 a user launches a GUI on a computer monitor that displays a plurality of input parameters or variables defining an illumination protocol. In one embodiment, the GUI allows the user to modify at least one of three parameters—a length ('tail'), a speed and/or a rate of a single pulse of LED. In alternate embodiments, the plurality of input parameters or variables are controlled and customized using a control system, such as the system 150 of FIG. 1C, wherein the control system comprises a microprocessor in data communication with a serial enabled LCD display and a 12 button keypad. Accordingly, in some embodiments, the input parameters or variables are displayed to the user on the serial enabled LCD display (such as display 160 of FIG. 1C). At step 410, the user inputs, or chooses from a drop down list, parameter value for a length ('tail') of the single pulse. At step 415, the user inputs, or chooses from a drop down list, parameter value for a speed of the single pulse. At step 420, the user inputs, or chooses from a drop down list, parameter value for a rate (or response time) of the single pulse. In alternate embodiments, steps 410, 415, 420 are accomplished by the user inputting values (for the length or tail, speed and rate of the single pulse) using the 12-button keypad (such as the keypad 165 of FIG. 1C). At step 425, the user authorizes, by clicking a submit button for example, the computer (or the microprocessor 155 of the control system 150 of FIG. 1C, in alternate embodiment) to implement an illumination protocol based on the input parameters at steps 410, 415 and 420.

In motion capture applications, movement of a real subject, such as a person (or actor) for example, is mapped onto a computer generated object. Motion capture (or mocap) systems are used in the production of motion pictures and video games for creating a digital representation of a person (or actor) that is used as source data to create a computer graphics (CG) animation. In accordance with aspects of the present specification, a speed of a single pulse moving along the LED strip functions as a reference speed for an actor to follow, or be in sync with, during a motion, such as running. In other words, the actor uses the moving single pulse, along the LED strip, as a reference point to chase while doing motion capture. A game may require an in-game digital representation, avatar or CG animation character to move, such as run or walk, at a plurality of desired speeds. Accordingly, an actor (corresponding to the digital representation or avatar) is required to move at speeds that can be mapped onto the digital avatar. An accuracy of speed of movement of the real subject is needed for matching a desired in-game movement speed of a corresponding digital avatar.

Figure 3A:
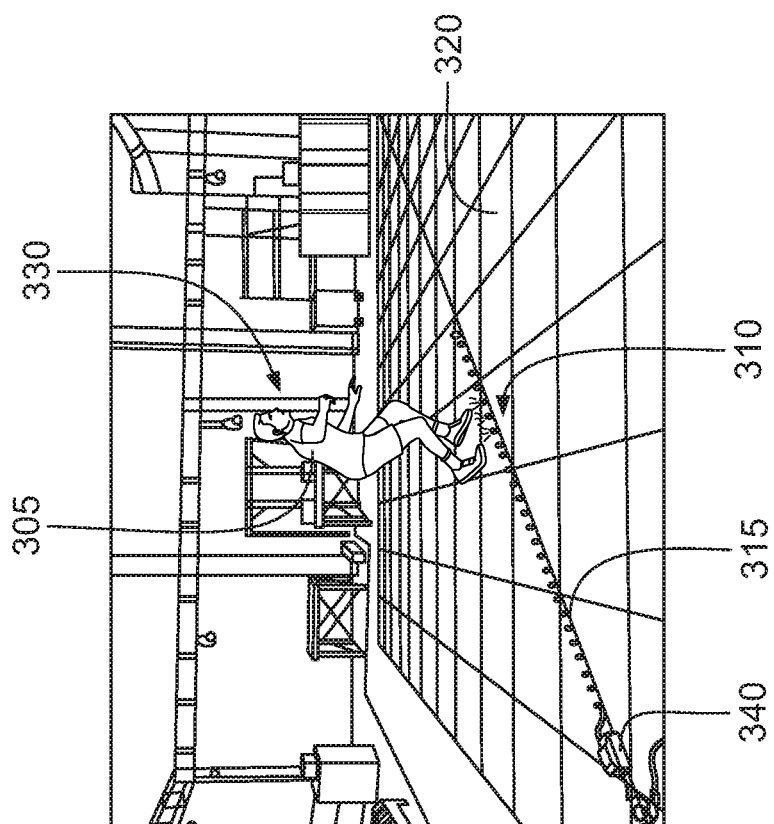
FIG. 3A shows a person in a first position while running substantially in sync with a moving pulse of LED light.
Figure 3B:
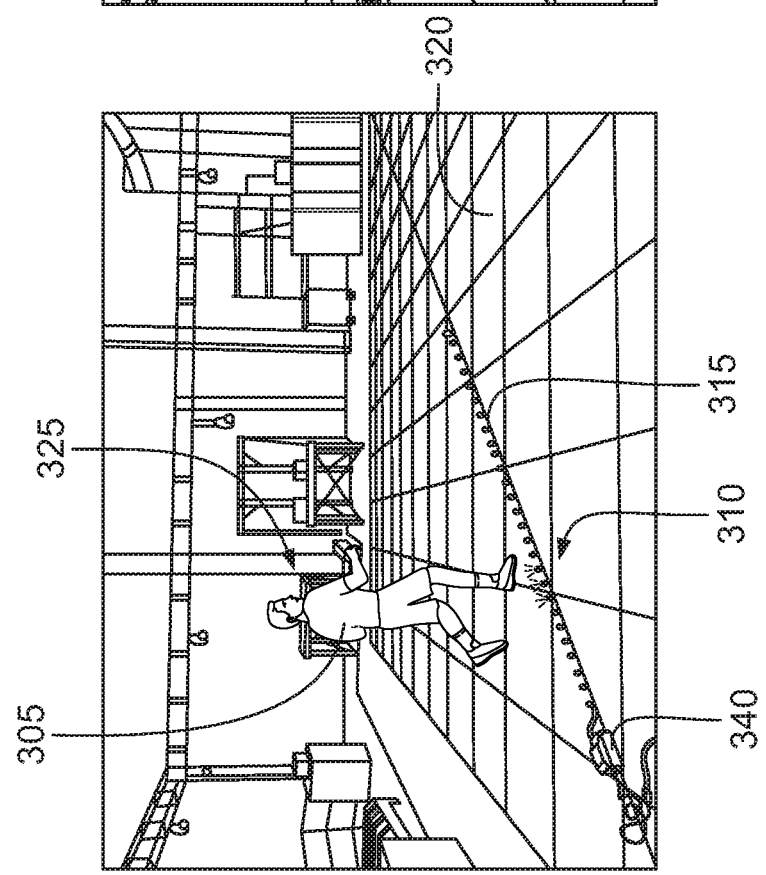
FIG. 3B shows the person in a second position while running substantially in sync with the moving pulse of LED light, in accordance with an embodiment of the present specification.

FIGS. 3A and 3B show an actor 305 moving in sync with a single pulse 310 traversing an LED strip 315 at a pre-defined speed, in accordance with embodiments of the present specification. Referring to FIGS. 3A and 3B together, the LED strip 315 is positioned on a floor 320. In accordance with an embodiment, the LED strip 315 is positioned in a straight line, path or trajectory such that the single pulse 310 appears to travel in a straight line, path or trajectory from a proximal end to a distal end of the strip 315. However, it should be appreciated that the LED strip 315 can be positioned, mounted, configured or affixed to the floor 320 to follow any other path or trajectory such as, but not limited to, zig-zag, curved, circular, quadrilateral, stairway, or any other geometrical trajectory as would be evident to persons of ordinary skill in the art. The speed of the single pulse 310, the rate as well as the length (or 'tail') of the single pulse 310 are programmed and customized using a control system 340 in communication with the LED strip 315.

The control system 340 comprises a processor to store and execute an illumination protocol for the LED strip 315 and, optionally, may have a receiver to receive values for the parameters or variables (related to the speed, rate and/or length of a single pulse) related to the illumination protocol from the control system 340. In some embodiments, the control system 340 may include an Arduino micro-controller and a Bluetooth or WiFi receiver, and, optionally, a serial enabled LCD display and a 12 button keypad in communication with each other.

As shown, the actor 305 is in a first position 325 in FIG. 3A moving in sync with a first location of the moving pulse 310 and is in a second position 330 in FIG. 3B moving in sync with a second location of the traversing pulse 310. Thus, in accordance with aspects, the actor 305 times his footsteps to meet a specific movement speed of the traversing pulse 310. Prior art movement synchronization or reference systems, such as those based on metronomes and treadmills, are difficult for people to understand or follow to stay in sync with and are inaccurate since movement speed could vary based on the length of a person's stride. With the motion capture movement reference system of the present specification, precise timing and movement speeds can be achieved by allowing a person to follow or chase a single pulse of an LED strip that is easy for the actor to understand, follow and stay in sync with. The speed of the single pulse can be set at a plurality of specific rates that match or correspond to a plurality of desired motion capture movement speeds.

Figure 6:
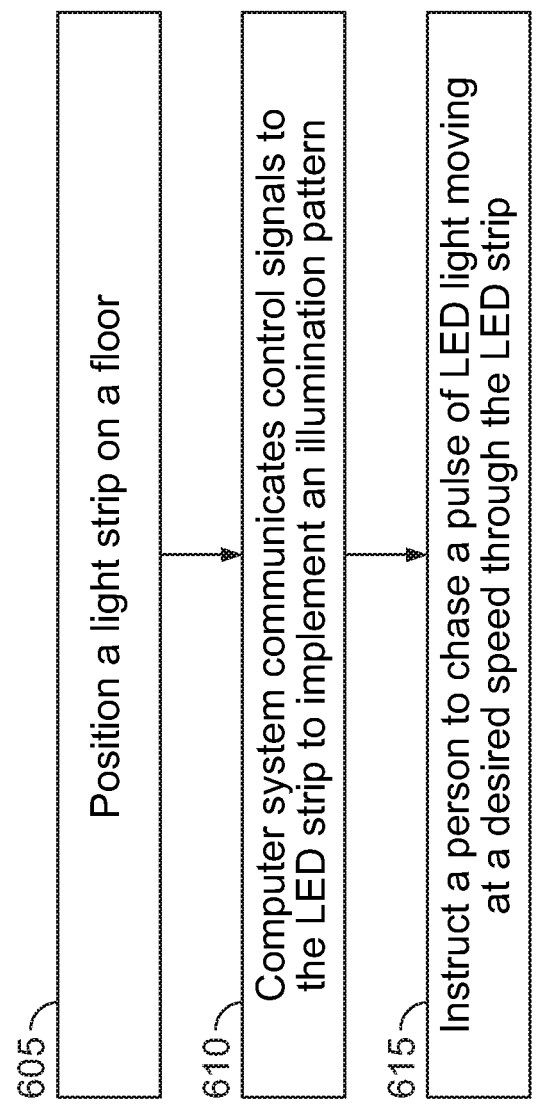
FIG. 6 is a flow chart illustrating an embodiment of a method of enabling a person to move at a desired speed using a motion capture movement reference system of the present specification.

FIG. 6 is a flow chart illustrating an embodiment of a method of enabling a person to move at a desired speed using the motion capture movement reference system of the present specification. At step 605, an LED strip is positioned on a surface, such as a floor. In some embodiments, the LED strip is positioned in a straight line, path or trajectory. As discussed, earlier in the specification, the LED strip comprises a plurality of LED elements, a plurality of control modules connected to at least one of the plurality of LED elements and a micro-controller in communication with the plurality of control modules. In some embodiments, each control module is connected to and controls switching on and off of three LED elements. However, the number of LED elements being controlled by each control module may vary in alternate embodiments.

At step 610, a computer system communicates control signals to the micro-controller and command the plurality of control modules to control associated LED elements in accordance with an illumination protocol. In various embodiments, the control signals for the illumination protocol include user defined parameters related to at least one of a length (or 'tail') of a single pulse—that is, the number of LED elements that should be switched on and off simultaneously, the speed at which the single pulse appears to traverse, cycle or move along the LED strip and the rate or response time of each LED element constituting the single pulse. Depending on the user defined parameters, the LED strip allows a pulse of LED light to traverse or travel through the strip at a desired or programmed speed. A user can customize or program the parameters, and hence the illumination protocol, using the computer system. Finally, at step 615, the person is instructed to chase the moving pulse so that the person is moving (running and/or walking) in sync with the speed or the travelling pulse. This enables the person to move at the same speed as that of the travelling pulse.

The above examples are merely illustrative of the many applications of the methods and systems of present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A method for providing movement guidance to an actor using a motion capture movement reference system, wherein the motion capture movement reference system comprises a light strip having an elongated substrate with a plurality of lights positioned in series along a length of the elongated substrate and a computing device configured to program said plurality of lights with an illumination protocol, the method comprising:
    determining a plurality of desired movements of a digital avatar;
    using said computing device, generating a graphical user interface to present to a user options to select values for at least a first parameter and a second parameter, wherein the first parameter is indicative of a speed at which a number of lights of the plurality of lights appear to traverse along the substrate, wherein the second parameter is indicative of whether said speed increases, decreases, or remains constant along the substrate, and wherein the selected values of the first parameter and the second parameters are based on one of the plurality of desired movements of the digital avatar;
    receiving an input corresponding to a first value for the first parameter and a second value for the second parameter;
    using said computing device, programming the light strip based upon at least the first value and the second value;
    instructing an actor to chase the plurality of lights as they traverse along the length of the elongated substrate; and
    initiating an activation and deactivation of the plurality of lights along the length of the elongated substrate based on at least the first value and the second value.

2. The method of claim 1, wherein said motion capture movement reference system comprises a plurality of control modules and a micro-controller, wherein each of said control modules is connected to at least one of said plurality of lights, and wherein said micro-controller is in communication with said plurality of control modules.

3. The method of claim 2, wherein said computing device includes a memory, a display, a keyboard and a processor, said computing device being in communication with said micro-controller, wherein said memory stores a plurality of instructions that instructs the processor to communicate control signals to said micro-controller, wherein said control signals enable said plurality of control modules to control said plurality of lights according to the first value and the second value.

4. The method of claim 3, wherein the first value and the second value define, at least in part, an illumination protocol and wherein the illumination protocol comprises a motion of a pulse from a proximal end to a distal end of said substrate, and wherein said pulse includes three lights switched on and off simultaneously.

5. The method of claim 4, wherein said control signals also determine a length of said pulse, and wherein said length includes LED elements in multiples of three.

6. The method of claim 2, wherein each of said control modules is connected to three lights and wherein said lights are LED elements.

7. The method of claim 1, wherein said graphical user interface is configured to present to the user options to select values for a third parameter, wherein the third parameter is indicative of a number of continuous light elements switched on or off simultaneously.

8. The method of claim 7, further comprising using at least one video camera to capture a motion of said actor while the actor chases said plurality of lights.

9. The method of claim 7, wherein said graphical user interface presents to the user options to select values for a fourth parameter, wherein the fourth parameter is indicative of a duration of time during which the number of continuous light elements are activated.

10. A method of guiding an actor, the method comprising:
    determining a desired movement of a digital avatar, wherein the desired movement is one of a plurality of customizable movements;
    positioning an elongated substrate on a floor, said substrate comprising a plurality of LED elements, at least one control module and a micro-controller,
    wherein said at least one control module is connected to at least one of said plurality of LED elements, and wherein said micro-controller is in communication with said at least one control module;
    using a computing device, generating a graphical user interface to present to a user options to select values for at least a first parameter and a second parameter of an illumination protocol,
    wherein the first parameter is indicative of a speed at which a number of LED elements of the plurality of LED elements appear to move along the substrate, and
    wherein the second parameter is indicative of whether said speed increases, decreases, or remains constant along the substrate;
    using the computing device, receiving inputs indicative of a first value for the first parameter and a second value for the second parameter;
    using the computing device, communicating control signals to said micro-controller,
    wherein said control signals program said at least one control module to control said plurality of LED elements according to the illumination protocol and
    wherein the illumination protocol is based on the desired movement of the digital avatar; and
    having said actor synchronously move with said illumination protocol to achieve said desired movement.

11. The method of claim 10, comprising a plurality of control modules, wherein each of said plurality of control modules is connected to at least three of said plurality of LED elements.

12. The method of claim 10, wherein said illumination protocol comprises a motion of a pulse from a proximal end to a distal end of said elongated substrate, and wherein said pulse includes a series of at least two LED elements switched on simultaneously and then switched off simultaneously.

13. The method of claim 12, further comprising having the actor chase said moving pulse to move at said desired movement.

14. The method of claim 10, wherein said graphical user interface presents to the user options to select a value for a third parameter, wherein the third parameter is indicative of a number of continuous LED elements switched on or off simultaneously.

15. The method of claim 14, wherein said graphical user interface presents to the user options to select a value for a fourth parameter, wherein the fourth parameter is indicative of a duration of time during which the continuous LED elements are activated.

16. The method of claim 14, wherein said control signals also determine a length of a pulse, and wherein said length includes LED elements in multiples of three.

17. A system for generating a moving pulse of light to act as a reference for an actor's motion, the system comprising:
   a flexible substrate strip having a plurality of LED elements;
   a plurality of control modules;
   a micro-controller, wherein each of said plurality of control modules is electrically associated with and controls at least two of said plurality of LED elements and wherein said micro-controller is in data communication with said plurality of control modules;
   a graphical user interface configured to present to a user options to select values for at least a first parameter and a second parameter of an illumination protocol, wherein the first parameter is indicative of a speed at which a number of LED elements of the plurality of LED elements appear to move along the substrate, wherein the second parameter is indicative of whether said speed increases, decreases, or remains constant along the substrate and wherein the graphical user interface is configured to receive inputs indicative of a first value for the first parameter and a second value for the second parameter; and
   a computer system configured to receive the first value and the second value, to generate signals that define the speed at which the number of LED elements of the plurality of LED elements appear to move along the substrate and whether the speed increases, decreases, or remains constant along the substrate, to generate the signals based on the first value and the second value, and to communicate signals to said micro-controller to generate said moving pulse.

18. The system of claim 17, wherein the graphical user interface is further configured to present an option to the user to customize a number of LED elements that simultaneously switch on and off.

19. The system of claim 17, wherein each of the plurality of control modules is associated with and controls three LED elements.

* * * * *